Nov. 12, 1957    J. M. NISSEN    2,812,913
DUST SPREADING MECHANISM FOR CROP DUSTING AIRPLANES
Filed March 15, 1954
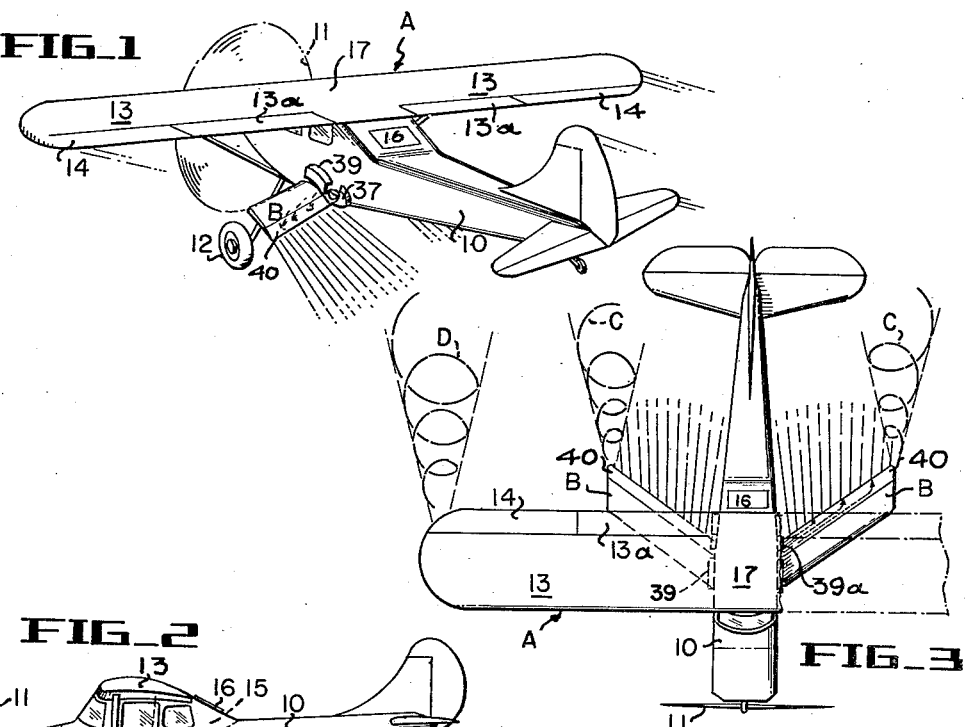
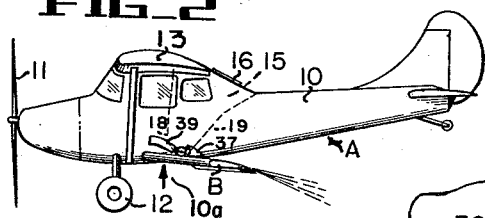
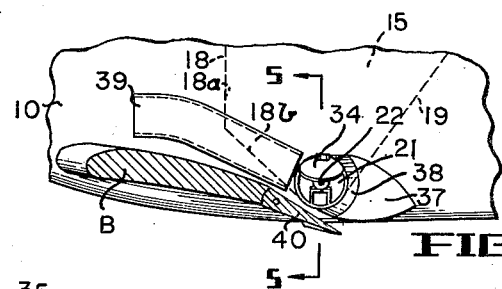
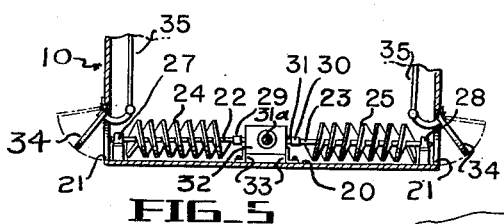
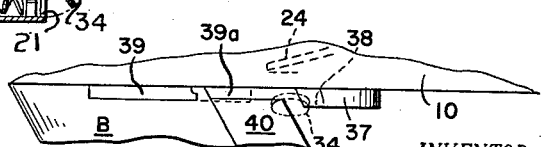
INVENTOR.
JAMES M. NISSEN
BY
ATTORNEYS

United States Patent Office 2,812,913
Patented Nov. 12, 1957

2,812,913

DUST SPREADING MECHANISM FOR CROP DUSTING AIRPLANES

James M. Nissen, San Jose, Calif.

Application March 15, 1954, Serial No. 416,273

12 Claims. (Cl. 244—136)

The present invention relates to crop dusting, and pertains more particularly to an airfoil arrangement for distributing insecticidal or fungicidal dust discharged from an airplane in a controlled pattern spanwise of the airplane.

In the dusting of crops by airplane, it has been customary in the past to arrange one or more venturi throats so as to direct an air stream through a zone of dust discharge from a dust hopper in an airplane, so as to entrain the dust from the hopper in the propeller slip stream in the vicinity of the fuselage.

The down-wash from the airplane wings tends to deflect the dust downwardly, but there is no appreciable lateral or spanwise spreading effect exerted on the dust stream until the gradually spreading wing tip vortices reach and act upon the dust in this stream. This spreading effect of the wing tip vortices has been observed as occurring approximately two hundred yards to the rear of the airplane. Since in dusting the plane is usually flown at an altitude of approximately five feet, by the time this spreading effect is ready to take effect, an important part of the dust is already in or closely adjacent the foliage of the crop being sprayed, so that effective even distribution of the dust is impossible. The result is that the dust is applied with a heavier streak portion under the central portion of the airplane's track over the crop, and lighter marginal portions on opposite sides of this central streak portion.

The present invention contemplates the provision of an improved and simplified dust distributing arrangement for use on crop dusting airplanes. The invention also provides improved dust distributing apparatus for spreading dust discharged at a predetermined rate from the dust hopper of an airplane in a controlled pattern transversely of the flight track of the airplane.

Another object of the invention is to provide by aerodynamic means a lateral distribution of dust so that the dust leaves the airplane in the form of a sheet. A still further object of the invention is to employ the spanwise air flow over the flap portion of a swept-back airfoil to control the discharge pattern of dust discharged from an airplane.

Another object of the invention is to provide an improved and simplified dust spreading airfoil arrangement for a crop dusting airplane.

These and other objects and advantages of the invention will be brought out in the following description and the accompanying drawings, wherein:

Fig. 1 is a perspective view of an airplane embodying the present invention as it would appear in flight.

Fig. 2 is a side elevational view of the airplane shown in Fig. 1.

Fig. 3 is a plan view of the same airplane, the left wing being broken away, and a portion thereof being indicated in broken lines, the wing tip vortices of the airplane wing and the dust spreading airfoil of the present invention being indicated diagrammatically in broken lines.

Fig. 4 is an enlarged fragmentary side elevational view of the dust discharging portion of the invention, a root portion of a dust distributing airfoil being shown diagrammatically in section.

Fig. 5 is a fragmentary sectional view taken along line 5—5 of Fig. 4, the dust distributing airfoils being omitted.

Fig. 6 is a fragmentary plan view of the structure shown in Fig. 4, the rear portion of the air deflecting ducts being broken away, and a duct control gate being shown in broken lines to discharge the air gap between the root of the flap and the airplane fuselage.

Referring to the drawings in detail, an airplane A of a type commonly employed in crop dusting operations comprises a usual fuselage 10, propeller 11, landing gear 12, wings 13, wing flaps 13a and ailerons 14.

A dust hopper 15 is built into the fuselage of the airplane as shown in Figs. 2 and 4 with a usual access and filling door 16 in the top of the fuselage just rearwardly of the trailing edge of the wing center section 17. The invention is illustrated as being embodied in a high wing monoplane, and while such an airplane is preferred, it will be obvious to those familiar with the art that the invention can be embodied in other types of aircraft.

The front wall 18 of the dust hopper 15 has an upright upper portion 18a and a rearwardly inclined lower portion 18b. The rear wall 19 of the hopper is inclined forwardly and downwardly, and the bottom 20 of the hopper is in the form of a rounded trough extending transversely of the airplane.

A pair of laterally directed dust outlets 21, 21 are provided one at each end of the transversely extending trough 20 of the dust hopper 15 to open exteriorly of the sides of the fuselage 10. These outlets are so located as to discharge the dust adjacent and preferably above the root of the flap portion of a dust spreading airfoil to be described later herein.

Suitable dust discharging mechanism is provided in the hopper 15. This may consist of a pair of co-axial shafts 22 and 23 (Figs. 4 and 5) having reversely pitched helical flights 24 and 25 secured coaxially thereon. The shafts 22 and 23 are journaled at their outer ends in bearings 27 and 28, respectively, and are coupled at their inner ends, by conventional drive couplings 29 and 30, to opposite ends of a short power driven shaft 31. Conventional gearing (not shown) is mounted in a central gear box 32, secured to the bottom of the hopper 15 by brackets 33, 33 (Fig. 5). Suitable power means such as a conventional electric motor (not shown) may be connected to a shaft 31a to drive the shaft 31 through the gearing in the box 32.

A dust control gate 34 is hingedly mounted at the upper side of each dust outlet 21, and is provided with suitable actuating means such as linkage 35, 35 connected in a conventional manner to a control lever, not shown, mounted within convenient reach of the pilot when seated in the airplane. Other well known means for controllably discharging dust from a hopper for entrainment in an air stream may of course be employed, such as, for example, the usual venturi tubes heretofore used on crop dusting airplanes. Also, mechanisms of the well known types used in ground dusters (not shown) for entraining dust in a high velocity air stream may be employed if desired. Since such dust discharging and entraining equipment is well known, and since the mounting thereof on an airplane would be well within the capabilities of an ordinary aircraft mechanic, details thereof are omitted from the present description.

A faired dust deflecting boss 37 preferably is provided rearwardly of each dust outlet 21. The forward face 38 of each boss 37 is curved concavely to conform to the curvature of the rear edge of its associated dust outlet 21. Each curved face 38 is inclined rearwardly and outwardly to deflect the air-entrained dust outwardly clear of the fuselage and into the zone directly above and at the rear of the flap portions of the dust pattern control airfoils of the present invention to be described later herein.

An air deflecting duct 39, open at both its forward and rearward ends, and with its open forward end located in a zone of high velocity airflow, may be provided forwardly of each dust outlet 21 to divert a blast of air across the dust discharge openings. If preferred, other means may be provided to insure entrainment of the dust in the air stream. For example, by providing an air gap at 39a (Figs. 3 and 6) between the root of the flap 40 of each dust distributing wing or airfoil B and the fuselage 10, the resultant current of air flowing through such a gap and across the dust outlets 21, 21 while the airplane is in flight will provide for air entrainment of the dust. Also, if a conventional venturi type dust feed is employed, the air flowing through the venturi will of course provide the necessary entrainment.

Each dust distributing airfoil B preferably is mounted with its center of lift as close as practicable to the longitudinal center of gravity, indicated by the arrow 10a (Fig. 2 of the airplane. Thus, in addition to their dust distributing characteristics, these airfoils B, B will contribute to the lift and load carrying capacity of the airplane.

Each dust distributing airfoil B is swept back at an angle preferably of the order of 30°. A flap 40 may be mounted in a conventional manner on the rear edge of each of the airfoils B, B. These flaps are arranged for angular adjustment relative to their respective airfoils B by conventional control means (not shown). Since various types of flap control means are well known to those familiar with the art, and since the details thereof are not material to the invention, they are not illustrated.

The sweep-back of the airfoils B, B, and their correspondingly swept-back flaps 40, tends to deflect the air stream flowing relatively rearwardly across these airfoils outwardly spanwise of the airplane. This lateral air stream deflecting effect may be increased by increasing the deflection angle between the flaps 40, 40 and their respective airfoils B, B. By adjusting the chordal angle of the flaps 40, 40 relative to the chords of the airfoils B, B upon which they are mounted, while at the same time visually observing the pattern of the sheet of dust discharged from the airplane, the pilot may adjust the flaps 40, 40 to provide an even dust distribution pattern. This adjustability of pattern is desirable, since it permits even application of lighter dusts as well as the heavier ones.

Airplane dusting operations are usually conducted at extremely low altitudes, in many instances approximately five feet above the plants or trees being dusted. The airplane usually is flown at a rather high angle of attack during the dusting run, so that the dust will be driven downwardly onto the crop foliage by the air displaced by the propeller and wings of the airplane. With prior arrangements, where the dust is merely discharged into the slip stream, the down wash from the wings tends to deflect the dust downward. The wing tip vortices D, D (Fig. 3) do not initially affect the dust pattern since they are laterally beyond the dust. However, they gradually increase in diameter downstream from the airplane, until, approximately two hundred yards to the rear of the airplane, they have increased to a diameter where they overlap each other and tend to spread the dust. At this stage however, part of the dust already has settled onto or among the foliage of the plants so that the spreading effect of the wing tip vortices occurs too late to result in an even distribution of the dust.

With my present invention however, the dust is discharged into the air stream at the root zone of the airfoils B, B rearwardly of and above the angularly downwardly offset flaps 40, 40. The dust is drawn laterally outwardly along the airfoils B, B by the spanwise flow of air created by the swept-back airfoils B, B with their relatively downturned flaps 40, 40. The result is that the dust is spread by the action of the airfoils B, B into a cloud of substantially uniform dispersion, the initial width of which equals the span of the airfoils B, B. The dust is deflected downwardly by the downwash from the airfoils B, B, which, as illustrated, include the flaps 40, and which preferably, and as illustrated in the drawings, is below the wash from the main wings 13 and the flaps 13a thereon. The wing tip vortices C, C (Fig. 3) from the airfoils B, B as indicated at Fig. 3 also assist in spreading the dust. By controlling the relative angle between the airfoils B, B and their flaps 40, 40 the proportional amount of dust conducted toward the tips of these airfoils may be so controlled that the resultant action of the tip vortices C, C may be utilized in controlling the distribution pattern of the dust. The tip vortices C, C from the airfoils B, B (Fig. 3) meet the tip vortices D (Fig. 3) from the main wings 13, 13 closely behind the airplane so that the dust spreading effect of the main wing tip vortices occurs much closer to the airplane than when the airfoils B, B are omitted.

When the pilot reaches the end of a dusting run, if it is necessary for him to climb rapidly to clear an obstruction, such as, for example, a row of trees, the auxiliary airfoils B, B with their flaps 40, 40 already set in a high lift position, will be of great assistance in helping the airplane clear the obstruction.

In using the present invention, the dust hopper 15 is filled with dust through the access door 16, after which the pilot takes off in a conventional manner. The flaps 40, 40 on the dust deflecting airfoils B, B may be either fixed or adjustable as desired. For best results however, it is preferred to have them adjustable as described herein. If adjustable, the flaps may be used or not during the takeoff as desired. When the airplane is airborne, except when dusting or when required for extra lift, the flaps 40, 40 preferably will be adjusted to conform to the attitude of the airfoils on which they are mounted.

As the pilot approaches the point at which he desires to commence his dusting run, he will adjust the position of the flaps 40, 40 to a desired angle relative to the dust distributing airfoils B, B. If he is continuing a dusting job which he had started previously, and knows the required angle of adjustment for the flaps 40 in order to provide a proper dust distribution pattern, he will adjust the flaps to such known angle. Otherwise, if it is a new dusting operation and he is not familiar with the dust distributing attributes of the particular airplane which he is flying, or if he has changed from a dust of one character to that of another, he will set the flaps 40, 40 to a desired initial or test angle, for example, approximately that shown in Fig. 4.

As he reaches the location at which he desires to begin his dusting operations, he descends to the desired altitude and places the airplane in a high angle of attack attitude. This directs the wash from the auxiliary airfoils B, B and their associated flaps 40, 40 downwardly onto the crops. When the pilot opens the gates 34, 34 over the dust outlets 21, 21 and energizes the drive means (not shown) to rotate the screw flights 24 and 25 to discharge dust from the hopper 15 through these outlets, he will observe the pattern of the dust as it leaves the airfoils and is deposited on the crops. If the pattern does not appear even, he may correct it by adjusting the relative attitude of the flaps 40, 40 with respect to their airfoils B, B and thus may provide for an evenly distributed dust deposit pattern.

In climbing to clear an obstruction at the end of the dusting run, the attitude of the flaps 40, 40 on the dust distributing airfoils B, B may be re-adjusted or not as desired.

While I have illustrated and described a preferred embodiment of the present invention, it will be understood however, that various changes and modifications may be made in the details thereof without departing from the spirit and scope of the invention as set forth in the appended claims.

Having thus described the invention, what I claim as new and desire to protect by Letters Patent is defined in the following claims:

I claim:

1. Dust spreading mechanism for a crop dusting airplane having a main wing and having a dust hopper mounted in the airplane with a dust discharge outlet opening from said hopper exteriorly of the airplane in vertically offset relation to the main wing thereof and control means mounted for controlling dust discharge through said outlet; said mechanism comprising a pair of swept-back airfoils substantially smaller than the main wing of the airplane, said airfoils being mounted on the airplane and extending laterally one from each side of the airplane, the root portion of each of said airfoils being located closely adjacent the dust discharge outlet to spread the dust discharged from said outlet spanwise of the airplane.

2. Dust spreading mechanism for a crop dusting airplane having a main wing, a dust hopper in the airplane with a dust discharge outlet opening from each side of said hopper exteriorly of the plane in vertically offset relation to the main wing of the airplane and control means mounted for controlling dust discharge through said outlet, said mechanism comprising a pair of swept-back airfoils mounted on the airplane and substantially smaller than the main wing of the airplane, said airfoils extending laterally one from each side of the longitudinal center line of the airplane, the root portion of each of said airfoils being located closely adjacent one of said dust discharge outlets to spread the dust discharged from the outlets spanwise of the airplane.

3. Dust spreading mechanism for a crop dusting airplane having a main wing and having a dust hopper mounted in the air plane with a dust discharge outlet opening from said hopper exteriorly of the airplane in vertically offset relation to the main wing thereof and control means mounted for controlling dust discharge through said outlet; said mechanism comprising a pair of swept-back airfoils substantially smaller than the main wing of the airplane, said airfoils being mounted on the airplane and extending one from each side of the airplane with the root portion of each of said airfoils closely adjacent said outlet, an air duct arranged with an intake end thereof positioned to receive a high velocity air current during flight of the airplane and mounted with an open discharge end thereof directed transversely across said outlet and into the atmosphere adjacent the root portion of each of said airfoils, for entrainment in said air blast of dust discharged through said outlet.

4. Dust spreading mechanism for a crop dusting airplane having a main wing and having a dust hopper mounted in the airplane with a dust discharge outlet opening from said hopper exteriorly of the airplane a substantial distance below the main wing thereof and control means mounted for controlling dust discharge through said outlet; said mechanism comprising a pair of laterally extending swept-back airfoils substantially smaller than the main wing of the airplane, said airfoils being mounted on the airplane and extending one from each side of the longitudinal center line of the airplane, a vertically adjustable flap portion pivotally mounted along the trailing edge of each of said airfoils and with an upper surface thereof adjacent said outlet, whereby dust discharged from said outlet enters the atmosphere adjacent an upper surface of the flap portion of each of said airfoils to spread the dust spanwise of the airplane.

5. Dust spreading mechanism for a crop dusting airplane of the high-wing monoplane type having a main wing and a fuselage, a dust hopper being mounted in the airplane with a pair of dust discharge outlets opening from said hopper exteriorly of the plane on opposite sides near the bottom of the airplane fuselage; said mechanism comprising a pair of laterally extending airfoils smaller than the main wing of the airplane and arranged in a swept-back position of approximately 30°, one of said airfoils being mounted on each side of the airplane fuselage with the root portion thereof located adjacent and directly below each of said dust discharge outlets, and air blast means mounted to direct an air blast therefrom past each outlet, thereby to entrain in such air blast the dust discharged from said outlets, whereby the air blast with the dust entrained therein enters the atmosphere above each of said airfoils for deflection thereby spanwise of the airplane.

6. Dust spreading mechanism for a crop dusting airplane of the high-wing monoplane type having a main wing and a fuselage, a dust hopper being mounted in the airplane with a pair of dust discharge outlets opening from said hopper exteriorly of the plane on opposite sides near the bottom of the airplane fuselage; said mechanism comprising a pair of airfoils substantially smaller than the main wing of the airplane mounted to extend laterally from the fuselage in a swept-back position of approximately 30°, one of said airfoils being mounted with its root located adjacent each of said dust discharge outlets, and means for directing an air blast past each of said dust discharge outlets thereby to entrain in the air blast dust discharged from the outlet, whereby the airblast with the dust entrained therein enters the atmosphere adjacent a root portion of each of said airfoils for deflection thereby spanwise of the airplane.

7. Dust spreading mechanism for a crop dusting airplane having a wing and a fuselage, a dust hopper being mounted in the airplane with a pair of dust discharge outlets opening from said hopper exteriorly of the plane on opposite sides of the airplane fuselage and control means mounted for controlling dust discharge through said outlets; said mechanism comprising a pair of laterally extending swept-back airfoils substantially smaller than the wing of the airplane and mounted on said fuselage to project laterally therefrom in a swept-back position of approximately 30°, a controllable flap mounted along the trailing edge of each of said airfoils, and means for deflecting the dust discharged by each of said outlets into the atmosphere above a root portion of each flap for spreading of the dust spanwise of the airplane.

8. Dust spreading mechanism for a crop dusting airplane of the high-wing monoplane type having a wing and a fuselage, a dust hopper being mounted in the airplane with a pair of dust discharge outlets opening from said hopper exteriorly of the plane on opposite sides near the bottom of the airplane fuselage and control means mounted for controlling dust discharge through said outlets; said mechanism comprising a pair of laterally extending swept-back airfoils substantially smaller than the wing of the airplane and mounted to extend laterally from opposite sides of the fuselage in vertically spaced relation to the wing of the airplane, and air diverting means mounted with a portion thereof exposed to the slip-stream of the airplane and positioned to divert a current of air from the slip stream past each dust outlet into the atmosphere directly above a root portion of each of said airfoils to entrain in such current dust discharged from said outlet and to carry the entrained dust into the atmosphere for spreading spanwise of the airplane.

9. Dust spreading mechanism for a crop dusting airplane having a wing and a fuselage, a dust hopper being mounted in the airplane with a pair of dust discharge outlets opening from said hopper exteriorly of the airplane on opposite sides near the bottom of the airplane fuselage and control means mounted for controlling dust discharge through said outlets; said mechanism comprising a pair of airfoils substantially smaller than the wing of the airplane and mounted to extend laterally from opposite sides of the airplane fuselage in a swept-back position of approximately 30°, one of said airfoils being mounted with its root located adjacent each of said outlets, a portion of each airfoil being spaced from the fuselage to admit an air current therebetween, a faired boss mounted on each side of the airplane directly rearwardly of each outlet, the forward face of each boss being sloped outwardly and rearwardly to deflect dust discharged from said outlet laterally away from the side of the fuselage, and an air deflector extending from a point in the slipstream of air moving rearwardly back along the fuselage when the airplane is in flight to a point adjacent each dust discharge outlet to divert an air current from the slip stream across the outlet toward the forward, sloping face of each boss, thereby to entrain in such air current dust discharged from the outlet and to carry the entrained dust into the atmosphere adjacent a root portion of the airfoil for spreading spanwise of the airplane.

10. Dust spreading mechanism for a crop dusting airplane having a wing and having a dust hopper mounted in the airplane with a dust discharge outlet opening from the hopper and means mounted for controllably discharging dust from the hopper through the outlet; said mechanism comprising a pair of swept-back wing-type airfoils mounted to extend laterally one from each side of the airplane fuselage, a flap adjustably mounted along the trailing edge of each swept-back airfoil, and airblast means mounted to entrain dust discharged from the dust discharge outlet and to direct the entrained dust into the atmosphere above a root portion of each of said flaps for spreading spanwise of the airplane.

11. In a crop dusting airplane having a dust hopper therein, a pair of wing-type airfoils extending laterally in swept-back position one from each side of the airplane, and air blast discharging means mounted to entrain dust from the hopper in an air blast and to discharge such air blast bearing the entrained dust into the air adjacent a root portion of each of said air foils.

12. In a crop dusting airplane having a dust hopper therein, a pair of wing-type airfoils mounted to extend laterally in swept-back position one from each side of the airplane, a flap portion hingedly mounted for vertical swinging adjustment along the trailing edge of each of said airfoils, and air blast discharging means mounted to entrain dust from the hopper in an air blast and to discharge such air blast bearing such entrained dust into the air adjacent a root portion of each flap portion.

References Cited in the file of this patent

UNITED STATES PATENTS

| | | |
|---|---|---|
| 1,580,301 | Johnson | Apr. 13, 1926 |
| 2,506,976 | Tharratt | May 9, 1950 |
| 2,557,522 | Vautier | June 19, 1951 |
| 2,591,157 | Hutchinson | Apr. 1, 1952 |

FOREIGN PATENTS

| | | |
|---|---|---|
| 471,177 | Great Britain | Aug. 30, 1937 |